Jan. 5, 1965  D. P. LAKE  3,164,506
METHOD OF BONDING END CLOSURES TO PAPER FILTER ELEMENTS
Filed May 4, 1961

INVENTOR.
David P. Lake
BY Peter P. Kozak
ATTORNEY 3,164,506
METHOD OF BONDING END CLOSURES TO
PAPER FILTER ELEMENTS
David P. Lake, Flint, Mich., assignor to General Motors Corporation, Detroit, Mich., a corporation of Delaware
Filed May 4, 1961, Ser. No. 107,704
5 Claims. (Cl. 156—69)

This invention relates to paper-type filter elements and more particularly to improvements in manufacturing methods of making filter elements.

A widely used filter medium for filtering lube oil in connection with the operation of internal combustion automobile engines consists essentially of an annular paper filter element, preferably folded to a bellows-like configuration to provide for a large surface area and structural strength, to which is fastened on each end thereof an end plate of rigid material. The paper element is desirably sealingly bonded to the end plates to insure that in operation the fluid being filtered does not bypass the filter medium by passing between the filter paper and the end cap and is protected by the perforated shells disposed on each side thereof. The filter elements are inserted in a housing whereby the fluid to be filtered passes into the filter radially of the filter element and passes out of the filter element axially thereof. The end caps and side shells provide a means for supporting the filter element within the filter housing.

Typical practice involves impregnating the filter paper with a suitable resin such as phenol-formaldehyde resin which is capable upon curing of providing the filter paper with structural strength without impairing the porosity thereof. Desirably the paper is adhesively bonded to the end plates by a suitable adhesive which upon curing will exhibit a sufficient degree of flexibility so that the normal car vibrations will not break the bond between the filter paper and the end plates and which will cure at temperatures which will not cause a charring of the filter paper.

It is the object of this invention to provide an efficient and economical method for making paper-type filter elements which includes the use of a resinous composition for impregnating the filter paper and an adhesive for bonding the filter paper to end plates which will cure at temperatures of about 290° F. and 320° F., a temperature range safely below the charring temperature of the paper whereby both the impregnant and adhesive are cured efficiently and economically in a single operation.

This and other objects of the invention are accomplished by providing an adhesive for bonding the filter paper to the end plates which comprises a vinyl plastisol including minor proportions of resorcinol and hexamethylenetetramine. Other objects and advantages of the invention will be apparent from the following detailed description of the invention made in conjunction with the accompanying drawings, in which.

Figure 1:
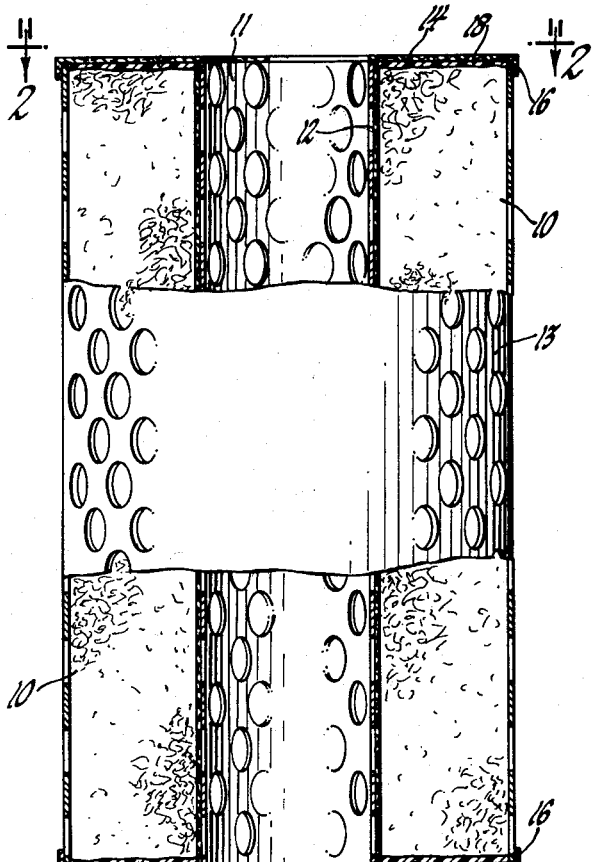
FIGURE 1 is an elevation view of a filter element in partial cross section.
Figure 2:
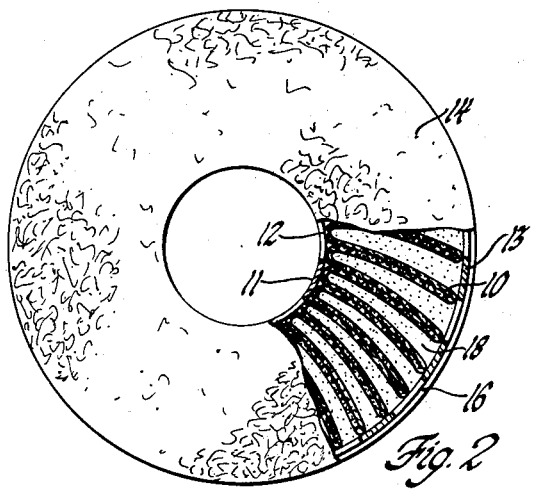
FIGURE 2 is an end view of the element in partial cross section.
Figure 3:
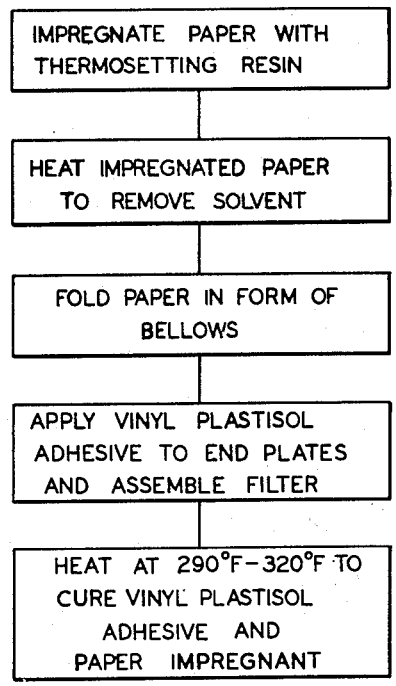
FIGURE 3 is a flow diagram of the process of this invention.

As shown in FIGURE 1, a paper-type filter element involved in this invention includes a folded paper element 10 formed into a cylinder having a central opening 12 therethrough. To each end of the paper cylinder there is bonded a rigid plate 14. Preferably the end plates 14 have flanged or overlapping edges 16. The ends of the paper element 10 are bonded to the end plates 14 by means of a layer of adhesive 18. Inner and outer perforated metal shells 11 and 13 are also bonded to the end plates.

As will be hereinafter described, this adhesive is applied in liquid form so that it may soak into the paper element and flow against the flanged portion 16 of the end plates and outer and inner shells to insure that a sealing bond is formed so that in subsequent use the fluid to be filtered does not pass between the end plate and the paper filter element. The end plates 14 may be formed of any suitable rigid material. Metal and phenol-formaldehyde resin impregnated fiber plates have been found satisfactory for this purpose.

As is well known in the art, the filter element is clamped in a housing in a manner such that a seal is provided between the end plates 14 and the housing and the fluid to be filtered is forced to pass into the central space 12 of the filter element through the paper element in a direction radially thereof and passes out of the filter element axially of the space 12.

In general, the manufacture of the filter element involves the sequential steps of first impregnating the paper with a suitable thermosetting resin suspended in a low viscosity solvent; then subjecting the impregnated paper to heat to drive off the solvent without significantly curing the resin; and then folding the paper and forming it into a cylinder as shown in FIGURE 1. Next, the adhesive material is applied to the inner surfaces of the end plates 14 as a layer 18. The parts including the shells 11 and 13 are assembled so that the ends of the paper element 10 are immersed in the adhesive layers 18 and then placed in an oven for a predetermined time whereby the resin impregnant as well as the adhesive will cure without charring or otherwise adversely affecting the filter paper.

As above indicated, the first step in the manufacture of filter elements involves the impregnation of the paper in order to impart to it suitable structural resistance toward collapse and tearing in operational use. Preferably the paper is impregnated with a resol phenolic varnish by means of a calendering apparatus such as is disclosed in the United States Patent No. 2,700,620, Somers, assigned to the assignee of the present invention. This resin varnish consists essentially of the resol form of phenol-formaldehyde resin contained in a solvent such as ethanol. A preferred impregnant is disclosed in the copending patent application Serial No. 107,665, filed May 4, 1961, and assigned to the assignee of the present invention. The impregnated paper is passed into a drying oven where most of the solvent is permitted to evaporate without significant cure of the resin material to permit subsequent folding and handling of the paper. This oven is preferably maintained at a temperature of about 140° F. to about 190° F. depending on the character of the impregnant used. The resol resin which has been deposited on the filter paper will cure readily at temperatures ranging from about 290° F. to 360° F. Since the paper tends to char at temperatures of about 345° F., it is essential that the curing of the paper impregnant be accomplished quickly at these temperatures and preferably be cured at substantially reduced temperatures.

An important aspect of this invention involves the provision of a vinyl plastisol adhesive which is employed to form the adhesive layers 18 to bond the end plates 14 to the paper element. The bond produced by means of this adhesive is at least equal to the strength of the paper, is relatively flexible on being cured and has the important property of being curable in a temperature range of about 290° F. to 320° F. in the same time that the resol base impregnant is cured at these temperatures to between 83% and 92% of completion, the desired degree of cure of the impregnant. This curing temperature provides a highly advantageous margin of safety with respect to the danger of the charring of the paper. The bond produced at these lower temperatures is equivalent to bonds produced by other vinyl plastisol-type adhesives at higher temperatures.

The adhesive composition in accordance with this invention has a particular application for joining the paper filter elements to end caps, particularly in filters for use in filtering lube oils, gasoline and the like. The adhesive is a liquid of sufficient viscosity which may be applied to the end caps in the form of a relatively uniform layer; on being cured, the adhesive is capable of resisting the solvent action due to lubricating oil type environments; on being cured the adhesive has sufficient flexibility to prevent fracture of the bond between the end caps and the plastisol due to vibrational forces normally produced in an automobile and as above described it is particularly suitable in that it may be readily cured at the relatively low temperatures of about 290° F. to 320° F., a temperature range normally employed in the cure of phenolic-type resins.

The vinyl plastisol adhesive of this invention consists of preferably a plastisol-grade polyvinyl chloride thoroughly dispersed in a dioctyl phthalate plasticizer in proportions of about 100 parts of the plasticizer by weight to 100 parts of the resin. Other plasticizers which may be employed include diisooctyl phthalate, didecyl phthalate, diisodecyl phthalate, octyldecyl phthalate, butyloctyl phthalate, butyldecyl phthalate and dicapryl phthalate. The proportion of the resin to plasticizer may range from about 75 parts of the plasticizer per 100 parts of the resin to about 125 parts of the plasticizer to 100 parts of the resin. The resin portion may include copolymers of polyvinyl chloride and similar polymers such as polyvinyl acetate and similar vinyl polymers. The plastisol itself has no significant adhesive properties. In order that the plastisol is provided with suitable adhesive properties which will cure in the temperature range of about 290° F. to 320° F., about 1% by weight of resorcinol together with about 2% by weight of hexamethylenetetramine are added to the vinyl plastisol in a substantially unreacted condition. These ingredients which are solids at room temperature may be ground to a fine powder and mixed with the vinyl resin powder before mixing with the plasticizer, or they may be wetted with a little plasticizer and mixed with the plastisol. Satisfactory adhesion and cure in the aforementioned temperature range is obtained with a variance of the resorcinol of between about 0.3% and 3% by weight and a variance in the hexamethylenetetramine of about 0.1% to 6% by weight. The upper limits of 3% and 6% respectively for the resorcinol and hexamethylenetetramine are practical limits. Additional amounts of each compound may be used. However, such additional amounts serve no useful purpose since at the 290° F. to 320° F. curing temperature level no significantly improved tensile strength or faster curing time is obtained by such additional increases. In fact, it has been found that the time necessary to cure a plastisol having resorcinol and hexamethylenetetramine above the limits of 3% and 6% is greater than that required below these limits. Amounts of resorcinol and hexamethylenetetramine up to 10% and 15% respectively may be used. However, beyond this point the adhesive on curing loses the desired degree of flexibility. These ingredients are, of course, thoroughly mixed to form a homogeneous mixture. Other ingredients such as stabilizers, dyes, pigments and fillers which are normally included in vinyl plastisol compositions may be added in small quantities.

In the final step of the process the adhesive composition which is in the form of a relatively viscous liquid is applied to the inner surfaces of the end plates 14 in the form of a layer 18 of about 1/8 inch to about 3/16 inch in thickness. The ends of the paper elements 10 are then immersed in these plastisol layers, care being taken so that the plates 14 are parallel to each other and each end of the paper element is enveloped in the vinyl plastisol adhesive. The assembly is then placed in an oven maintained between 290° F. and 320° F. and preferably between 300° F. and 310° F. for a time sufficient to cure the paper impregnant to about 83% to 92% of completion and to cause a fusion of the plastisol and a cure of the resorcinol hexamethylenetetramine components. During the heating process the hexamethylenetetramine decomposes into formaldehyde and ammonia and the resorcinol and formaldehyde react to form a thermosetting condensation product and to impart strong adhesion properties to the plastisol composition. The bond between the end plates 14 and the paper element 10 is stronger than the paper conventionally used in filter applications. As is understood in the art, the filter paper impregnant is cured to about 83% to 92% of completion since above this percentage cure, the paper is unduly brittle and below this range, the uncured portions tend to be dissolved by the hydrocarbon being filtered.

The time during which the paper element is kept in the oven within the temperature range of 290° F. to 320° F. will vary considerably with the particular characteristics of each oven and the correct time of cure must be determined for each oven. However, in accordance with this invention, the time of cure is similar to that necessary to achieve a cure of about 83% to 92% in the impregnant as well as a fusion of the plastisol and a cure of the resorcinol and hexamethylenetetramine. Under specific operation conditions, for example, satisfactory cure of all the compositions was achieved in 15 minutes at 310° F. Cures substantially below 290° F. are avoided since the plastisol does not fuse efficiently at these temperatures.

An important advantage of this adhesive is that the presence of the resorcinol and hexamethylenetetramine does not reduce the shelf-life of the adhesive. The material develops adhesive properties only after being heated to elevated temperatures as a result of which the hexamethylenetetramine decomposes to produce an environment favorable to the reaction and cure of the formaldehyde and resorcinol.

Although the invention has been described in terms of a specific embodiment, it is to be understood that variations may be employed and that the invention is not to be limited thereby except as defined in the following claims.

I claim:

1. The process for making paper filter elements comprising the steps of forming a tubular paper filter element, placing an end plate adjacent an end of said filter element, applying a layer of adhesive comprising a vinyl plastisol including small amounts of resorcinol and hexamethylenetetramine between said paper element and said end plate, and heating the assembly at a temperature and for a time sufficient to fuse said vinyl plastisol and to cause a reaction and cure of the resorcinol with the formaldehyde resulting from the decomposition of the hexamethylenetetramine.

2. A process for making paper filter elements comprising the steps of forming a tubular paper filter element, placing an end plate adjacent an end of said filter element, applying a layer of adhesive between said paper element end and said end plate, said adhesive comprising a vinyl plastisol including small proportions of resorcinol and hexamethylenetetramine, and heating the assembly at a temperature of about 290° F. to 320° F. for a time sufficient to effect a fusion of said vinyl plastisol and a reaction and cure of the resorcinol with formaldehyde resulting from a decomposition of the hexamethylenetetramine.

3. A process for making a paper filter element comprising the steps of impregnating the paper element with a phenolic resin capable of curing in a temperature range of about 290° F. to 320° F., forming said paper into a cylindrical configuration, placing an end plate adjacent one end of said paper element, applying an adhesive layer between said end plate and said paper element, and subjecting the assembly to heat at a temperature of from about 290° F. to 320° F. for a time sufficient to cure said adhesive layer and said phenolic resin to about an 83% to 92% degree of completion, said adhesive layer comprising a vinyl plastisol including at least about 0.3% by weight resorcinol and at least about 0.1% by weight of hexamethylenetetramine.

4. A process for making a paper filter element comprising the steps of impregnating the paper element with a phenolic resin capable of curing in a temperature range of about 290° F. to 320° F., forming said paper into a cylindrical configuration, placing an end plate adjacent one end of said paper element, applying an adhesive layer between said end plate and said paper element, and subjecting the assembly to heat at a temperature of from about 290° F. to 320° F. for a time sufficient to cure said adhesive layer and said phenolic resin to a degree of about 83% to 92%, said adhesive layer comprising a vinyl plastisol including about 0.3% to 3% by weight resorcinol and 0.1% to 6% by weight of hexamethylenetetramine.

5. A process for making paper filter elements comprising the steps of forming an annular paper filter element, placing an end plate adjacent an end of said filter element, applying a layer of adhesive between said paper element end and said end plate, said adhesive comprising a vinyl plastisol including at least about 0.3% by weight resorcinol and at least about 0.1% by weight hexamethylenetetramine, and heating the assembly at a temperature of about 290° F. to 320° F. for a time sufficient to effect a fusion of said vinyl plastisol and a reaction and cure of the resorcinol with formaldehyde resulting from a decomposition of the hexamethylenetetramine.

References Cited in the file of this patent
UNITED STATES PATENTS

| | | |
|---|---|---|
| 2,542,048 | Nagel | Feb. 20, 1951 |
| 2,739,916 | Parker | Mar. 27, 1956 |
| 2,749,265 | Fricke et al. | June 5, 1956 |
| 2,951,769 | McKnight | Sept. 6, 1960 |

FOREIGN PATENTS

| | | |
|---|---|---|
| 120,558 | Australia | Nov. 5, 1945 |